Patent 4,335,949

United States Patent [19]

Kukucka et al.

[11] 4,335,949
[45] Jun. 22, 1982

[54] REPRODUCTION MACHINE WITH RECIRCULATING DOCUMENT HANDLER DIAGNOSTICS

[75] Inventors: William P. Kukucka, Webster; John W. Daughton, Fairport, both of N.Y.

[73] Assignee: Xerox Corporation, Stamford, Conn.

[21] Appl. No.: 115,975

[22] Filed: Jan. 28, 1980

[51] Int. Cl.³ .......................................... G03G 15/00
[52] U.S. Cl. .................. 355/3 R; 355/14 SH; 355/77
[58] Field of Search ............ 355/14 R, 14 C, 14 SH, 355/77, 3 R; 235/92 SB; 371/29; 271/259

[56] References Cited

U.S. PATENT DOCUMENTS

| | | | |
|---|---|---|---|
| 4,035,072 | 7/1977 | Deetz et al. | 355/14 C |
| 4,156,133 | 5/1979 | Legg | 235/92 SB |
| 4,162,396 | 7/1979 | Howard et al. | 355/14 C |
| 4,186,299 | 1/1980 | Batchelor | 355/14 C |

*Primary Examiner*—Richard L. Moses
*Attorney, Agent, or Firm*—Ronald F. Chapuran

[57] ABSTRACT

A reproduction machine having a recirculating document handler, a display, and the means to enter a diagnostic mode for immediate access of time periods between sensors detecting document travel in the document handler. Upon entering the diagnostic mode, the first requested event of six events or time periods is displayed, the display providing the number of the event and the time period in milliseconds. To successively display the remaining events or time periods between different sets of sensors, it is only necessary to activate a suitable push button on the operator console to display the remaining events in succession.

5 Claims, 7 Drawing Figures

FIG. 7

REPRODUCTION MACHINE WITH RECIRCULATING DOCUMENT HANDLER DIAGNOSTICS

This invention relates to a document reproduction apparatus with a recirculating document handler (RDH) and in particular to RDH diagnostics.

Diagnostics related to sheet travel is already well known. For example, U.S. Pat. No. 3,709,485 assigned to the same assignee as the present invention, relates to detection of paper jams caused by copies in the sorter apparatus of a reproduction machine. U.S. Pat. No. 4,156,133 also assigned to the same assignee as the present invention, discloses the use of sensors to detect the presence of paper sheets traveling along the paper path, a memory for storing electrical representations of time for the sheet to travel between the sensors, and a display for indicating the sheet travel time.

It is taught in U.S. Pat. No. 4,156,133 that time periods of paper path travel between various sensors can be displayed for a previous copy run. It is also shown that the document handler can be diagnosed or exercised without making copies. That is, documents can be circulated to determine document travel time. This operation in the above identified system is only available to the service representative. Once the service representative enters this diagnostic mode, a number is entered in order to display the travel time between a given two set of sensors. This is a valuable diagnostic aid in order to check for potential malfunctions in the document handler.

However, to be able to check a time interval between a second set of given sensors in the above described system, it is necessary to exit the diagnostic mode and enter the normal operating mode to request the second time interval, and then return to the diagnostic mode. In other words, it is not possible in the diagnostic mode to continually monitor the time periods between the various sensors but can only monitor the time period between two given sensors while in a diagnostic mode. In addition, an actual time is not displayed but only a representation.

It would be a much more valuable diagnostic tool if various time intervals between sensors could be immediately displayed to ensure the capture of the malfunction and to provide immediate corrective action.

It would therefore be desirable to provide a diagnostic aid for a recirculating document handler in which time periods between various sensors can be successively displayed while the machine is in the diagnostic mode.

It is therefore an object of the present invention to provide a new and improved document handler diagnostic aid and in particular a diagnostic aid that is versatile and permits immediate display of time periods between various document sensors in the recirculating document handler. Further advantages of the present invention will be apparent as the following description proceeds, and the features characterizing the invention will be pointed out with particularity in the claims annexed to and forming a part of this specification.

Briefly, the present invention is concerned with a reproduction machine having a recirculating document handler, a display, and the means to enter a diagnostic mode for immediate access of time periods between sensors detecting document travel in the document handler. Upon entering the diagnostic mode, the first requested event of six events or time periods is displayed, the display providing the number of the event and the time period in milliseconds. To successively display the remaining events or time periods between different sets of sensors, it is only necessary to activate a suitable push button on the operator console to display the remaining events in succession.

For a better understanding of the present invention, reference numerals have been applied to like parts wherein.

DETAILED DESCRIPTION

Figure 1:
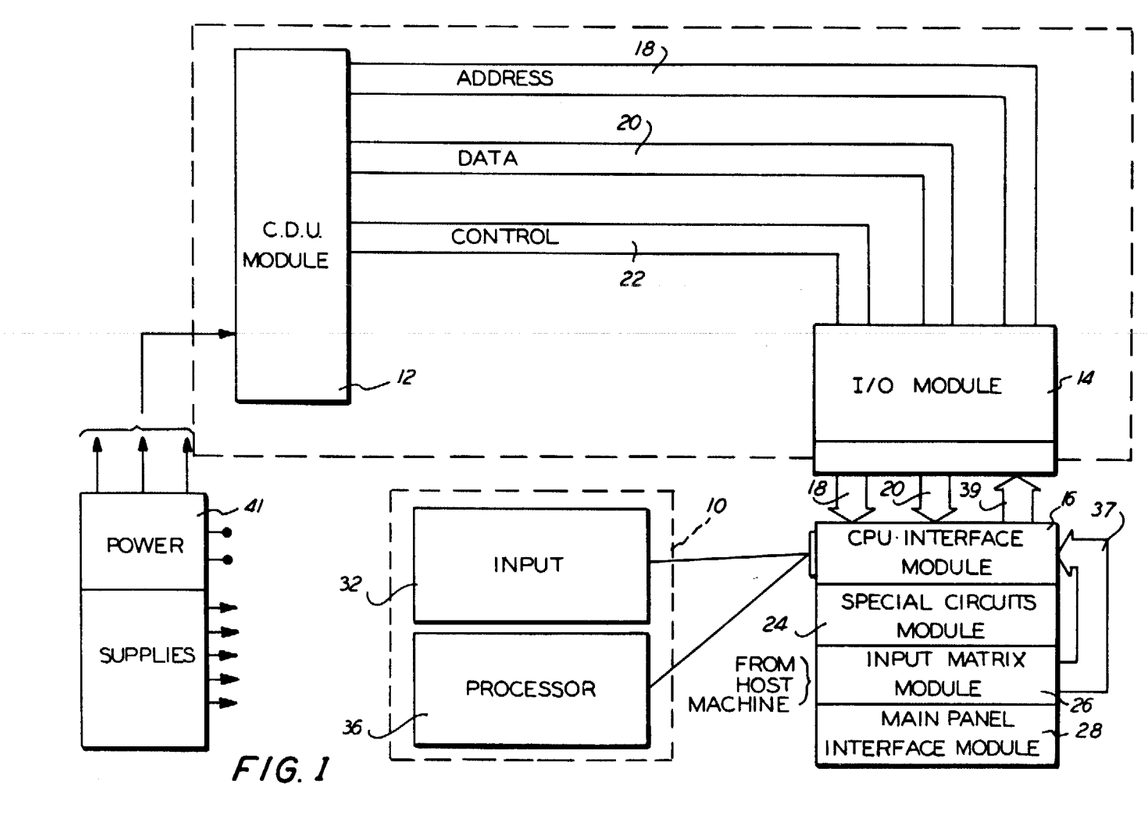
FIG. 1 is a block diagram of the controller incorporating the present invention.

Referring to FIG. 1, there is shown a reproduction machine 10 and a controller including a central processor unit (CPU) module 12, input/output (I/O) module 14 and CPU interface module 16. Address, data and control buses 18, 20 and 22 couple CPU module 12 and I/O module 14.

CPU interface module 16 connects the I/O module 14 with special circuits module 24, input matrix module 26 and main panel interface module 28. The CPU interface module 16 also interconnects I/O module 14 to the operating sections of the reproduction machine 10 namely, input section 32, and processor section 36.

Switch and sensor inputs are provided to the CPU module 12 from the machine from either the input matrix module 26 or the main panel interface module 28 via data buses 37 and 39. A power supply 41 is also interconnected to CPU module 12 as well as to other control elements.

Figure 2:
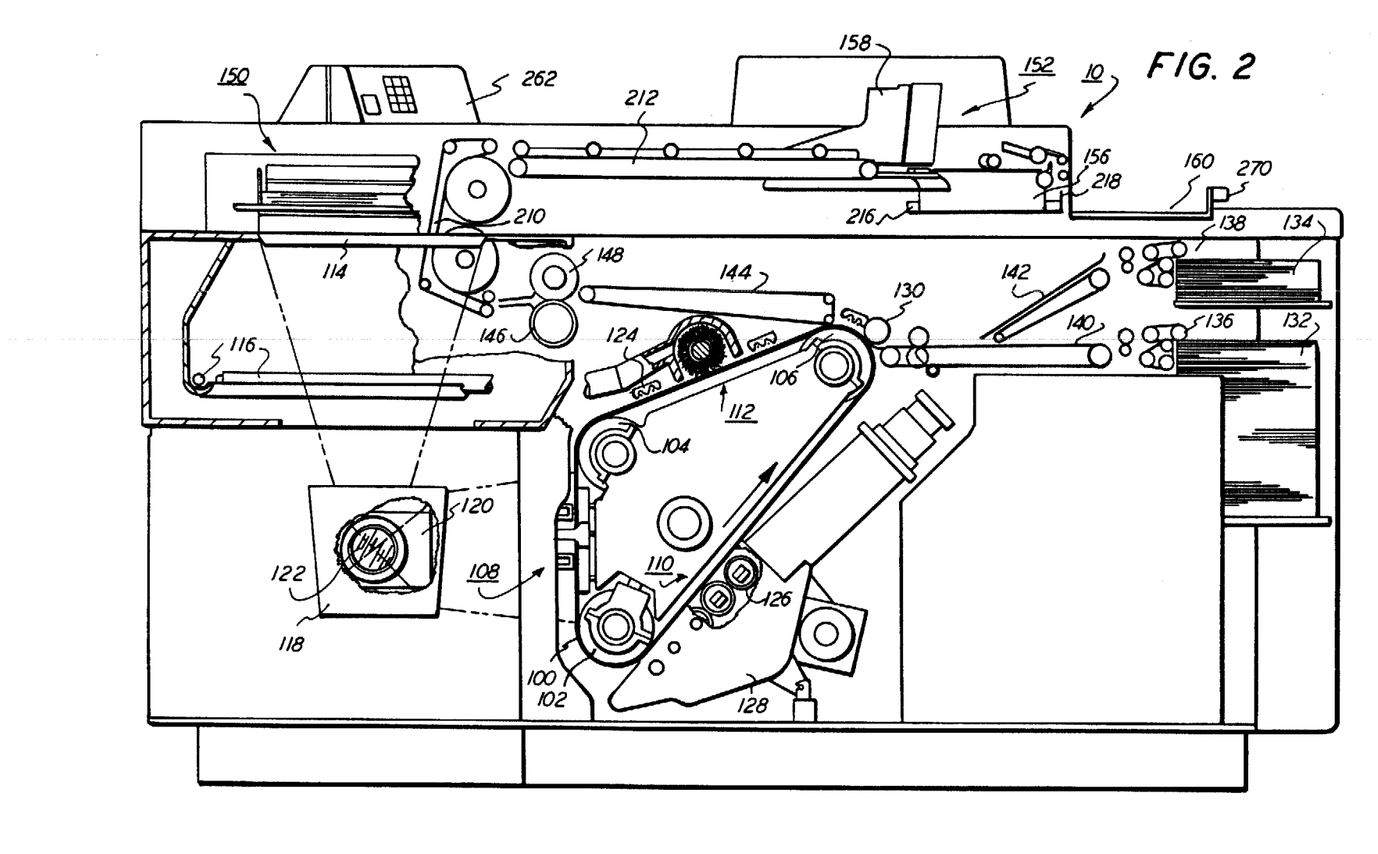
FIG. 2 is a cutaway elevational view of an exemplary reproduction apparatus incorporating the control system of FIG. 1.

Referring particularly to FIG. 2 of the drawings, there is shown, in schematic outline, an electrostatic reproduction machine or host machine, identified by numeral 10, incorporating the control arrangement of FIG. 1.

The machine 10 uses a photoreceptor in the form of an endless photoconductive belt 100 supported in generally triangular configuration by rolls 102, 104 and 106 and comprising a photoconductive layer of selenium, on a conductive substrate. Belt 100 is supported to provide substantially flat areas at exposure, developing, and cleaning stations 108, 110, 112 respectfully. The photoconductive belt 100 moves in the direction indicated by the solid line arrow, drive being provided through roll 106, in turn driven by a not shown main drive motor.

Machine 10 includes a generally rectangular, horizontal transparent platen 114 on which each original or document to be copied is disposed. A two or four sided, illumination assembly 116, disposed below and along at least two sides of platen, is provided for illuminating the original on platen 114. The light image generated by the illumination system is projected via mirrors 118, 120 and a variable magnification lens assembly 122 onto the photoreceptor belt 100 at the exposure station 108. To prepare belt 100 for imaging, belt 100 is uniformly charged to a preselected level by charge corotron 124. Magnetic brush rolls 126 are provided in a developer housing 128 at developing station 110. The bottom of housing 128 forms a sump within which a supply of developing material is contained.

To transfer developed images from belt 100 to the copy sheets, a transfer roll 130 engages copy sheets driven from either main or auxiliary tray 132, 134 by main and auxiliary sheet feeders 136, 138, respectively. Paper is generally fed from the main tray 132. Main transport 140 extends from main paper tray 132 to transfer roll 130 and is driven from the main motor. Auxiliary transport 142 extends from auxiliary tray 134 to main transport 140 and is also driven from the main motor. The image bearing sheets leaving the nip formed by photoconductive belt 100 and transfer 130 are picked off by vacuum transport 144 and conveyed to the fuser having a lower heated fuser roll 146 and upper pressure roll 148.

The reproduction machine 10 also includes a recirculating document handler (RDH) shown generally at 150 and a finishing station shown generally at 152. The recirculating document handler 150 shown in detail in FIG. 3 feeds originals automatically into platen 114 from tray 154. The machine 10 can make multiple collated sets of originals by successively feeding and removing originals from the platen 114. A manual input station is also provided to place an original under platen 114.

The finisher 152 contains a compiler tray 156, a stapler 158 and an offsetting catch tray 160. In the non-collation or stacks mode, successive, identical copy sheets are fed directly through the finisher 152 to the offsetting catch-tray 160. In the collation (RDH) or sets mode, successive, non-identical copy sheets are fed into the compiler tray 156 and compiled until the completion of the set. At this time the set is stapled or not stapled as required, and ejected to the offsetting catch-tray 160. The offsetting catch-tray 160 offsets between successive sets to maintain set identity. A list of possible combinations between document input, copy, and output format is shown in Table I.

TABLE I
LIST OF AVAILABLE MODE COMBINATIONS

| Document Input | Copy | Offset Outputs |
| --- | --- | --- |
| Manual Platen | 1/Sided Copy/Main Fd | Stacks |
| Manual Platen | 1/Sided Copy/Aux Fd | Stacks |
| Auto Feed/1 Sided Doc | 1/Sided Copy/Main Fd | Sets |
| Auto Feed/1 Sided Doc | 1/Sided Copy/Main Fd | Stapled Sets |
| Auto Feed/1 Sided Doc | 1/Sided Copy/Aux Fd | Sets |
| Auto Feed/1 Sided Doc | 1/Sided Copy/Aux Fd | Stapled Sets |
| Auto Feed/1 Sided Doc | 2/Sided Copy/Main Fd | Sets |
| Auto Feed/1 Sided Doc | 2/Sided Copy/Main Fd | Stapled Sets |
| Auto Feed/1 Sided Doc | 2/Sided Copy/Aux Fd | Sets |
| Auto Feed/1 Sided Doc | 2/Sided Copy/Aux Fd | Stapled Sets |
| Auto Feed/2 Sided Doc | 2/Sided Copy/Main Fd | Sets |
| Auto Feed/2 Sided Doc | 2/Sided Copy/Main Fd | Stapled Sets |
| Auto Feed/2 Sided Doc | 2/Sided Copy/Aux Fd | Sets |
| Auto Feed/2 Sided Doc | 2/Sided Copy/Aux Fd | Stapled Sets |
| Auto Feed/1 Sided Doc | 1/Sided Copy/Main Fd | Stacks |
| Auto Feed/1 Sided Doc | 1/Sided Copy/Aux Fd | Stacks |

Figure 3:
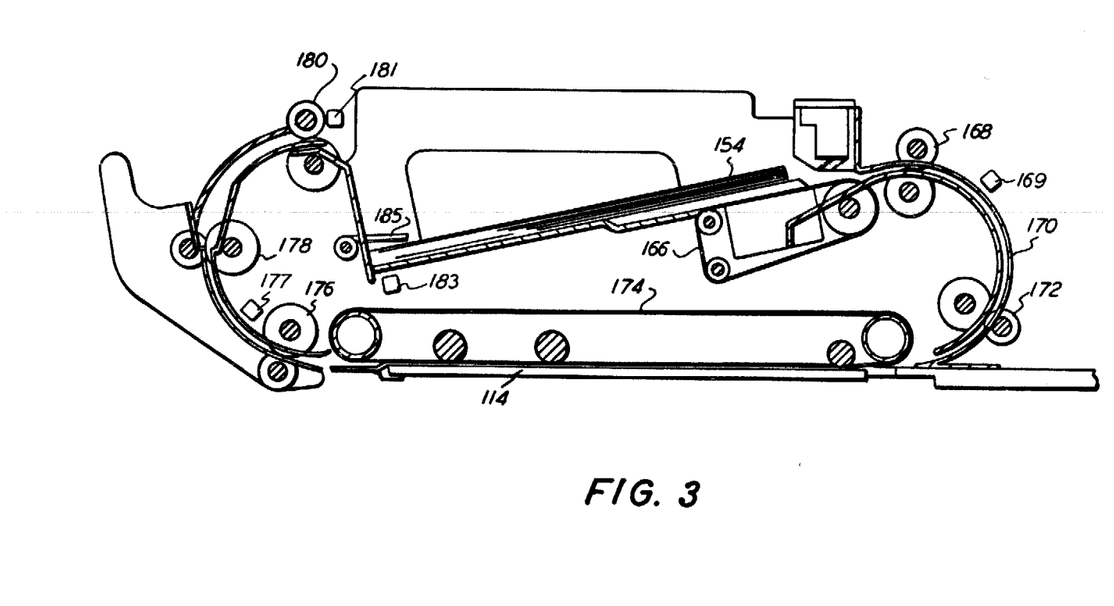
FIG. 3 is an elevational view of the recirculating document handler of the reproduction apparatus shown in FIG. 2.
Figure 4:
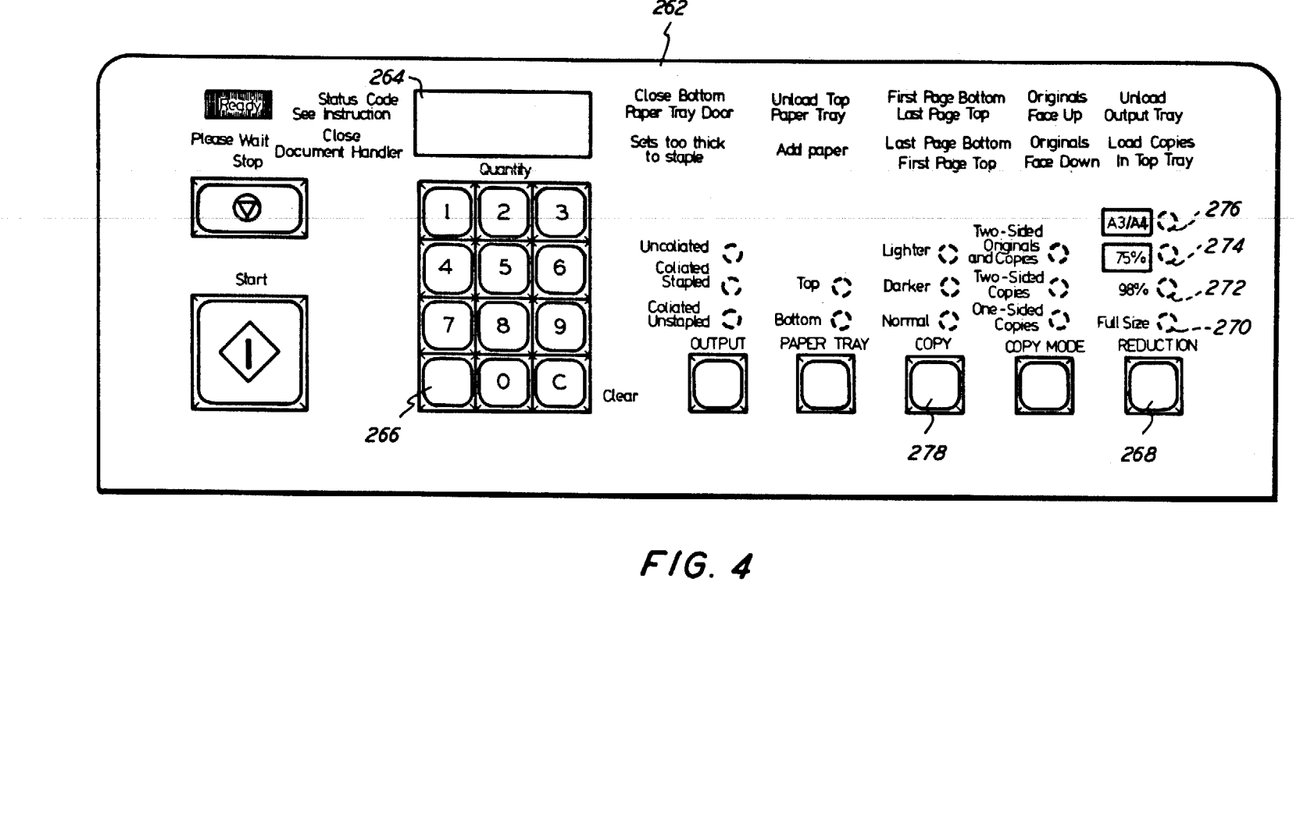
FIG. 4 is a detailed illustration of the operator control console shown in FIG. 2.

With reference to FIGS. 3 and 4 for the RDH 150 mode and one sided documents and copies, the operator programs the machine and places the originals in the RDH tray 154 face up (1 to N).

Documents are driven one at a time in N to 1 sequence from the bottom of the set in tray 154 by feeder belt 166 to tray takeaway rollers 168, past feeder sensor 169 to platen entry rollers 172. The platen entry rollers 172 drive the document into engagement with platen belt 174 for movement onto platen 114 in synchronism with the movement of the preceding document off platen 114.

After exposure, documents are driven off platen 114 by platen belt 174 into engagement with return transport rollers 176. The documents are conveyed past platen exit sensor 177 to middle rollers 178 to tray entry rollers 180 and past tray entry sensor 181 for return to tray 154. A set sensor 183 detects the movement of bail bar 185 to indicate a complete set of documents has been fed from the RDH. The bail bar 185 rests on the last document to be imaged and documents returning to the input tray 154 are stacked on top of the bail bar 185. The reproduction machine develops and delivers each copy in sequence face up to the catch tray 160. Complete sets of N copies are each offset in tray 160 and if the staple mode is selected the sets are stapled.

For one sided originals/two sided copies, in the first pass, the operator places the document in the RDH tray 154 face up in reverse order and presses Print. The RDH advances each original in sequence and the even originals are flashed in (2-N) sequence. If the set has an odd number of pages, the machine processor passes a blank sheet at the end of each set. There is no precount of documents by the RDH and there is one flash per two document feeds. The machine processor feeds a copy every other pitch or copy cycle. Skipped pitches are faded out with a pitch fadeout lamp. The copies are delivered to output tray 160 face up in descending order. That is 8 (or blank if odd number of originals)
6
4
2

The blank sheet is not billed and the tray 160 does not offset the set. Stapling, if selected, is inhibited during this pass. In the second pass, the operator removes the documents and reorders them into the original order, loads the RDH tray 154, moves the half-copies to the auxiliary feed tray 134 and presses Print. The RDH 150 operation is the same as first pass except odd documents are flashed (N-1). Again there is one flash per two feeds. The one side or half-copies are then conveyed from feed tray 134 via transport 142 to transfer roll 130 to receive a second side image. The machine processor operation is the same as the first pass except copies in the output tray 160 are in the correct order and the sets are offset. If selected, stapling of the sets is accomplished at this time. That is, the copy sheets for one complete set are accumulated in compiler tray 156, stapled and then ejected to the catch tray 160.

For the RDH 150 mode and two sided originals/two sided copies, in the first pass, the operator places the documents face down into RDH tray and presses Print. The RDH advances each document in 1-N sequence and flashes the back side of each document once per copy. There is one flash per feed. The machine processor develops and delivers each copy in sequence to the output tray 160 with one pitch skipped between sets. There is no offset of copies nor stapling. In the second pass, the operator flips the stack of documents over in the RDH tray 154, moves the half-copies from the output tray 160 to the auxiliary feed tray 134, and presses Print. The RDH operates the same as first pass except front sides are flashed in (N-1) sequence (one flash/feed). The machine processor operation is the same as the first pass except copies are in correct order and the sets are offset in the output tray, and if selected, the sets are stapled.

For the RDH mode of operation and stacked or uncollated copies, the operator places the documents face up in the RDH, programs the machine and presses Print. The machine makes the total quantity of copies programmed of the button document, delivers them to output tray 160 (does not compile) and shifts the tray after the last copy of each document is delivered. The RDH 150 indexes to the next document and resumes copying. The job output is offset stacks.

For manual operation, the operator places the document or book on platen 114 and presses Print. The machine makes the required copies, stacks them directly in the output tray 160 (not compiled), stops, shifts the tray and displays Ready.

Figure 5:
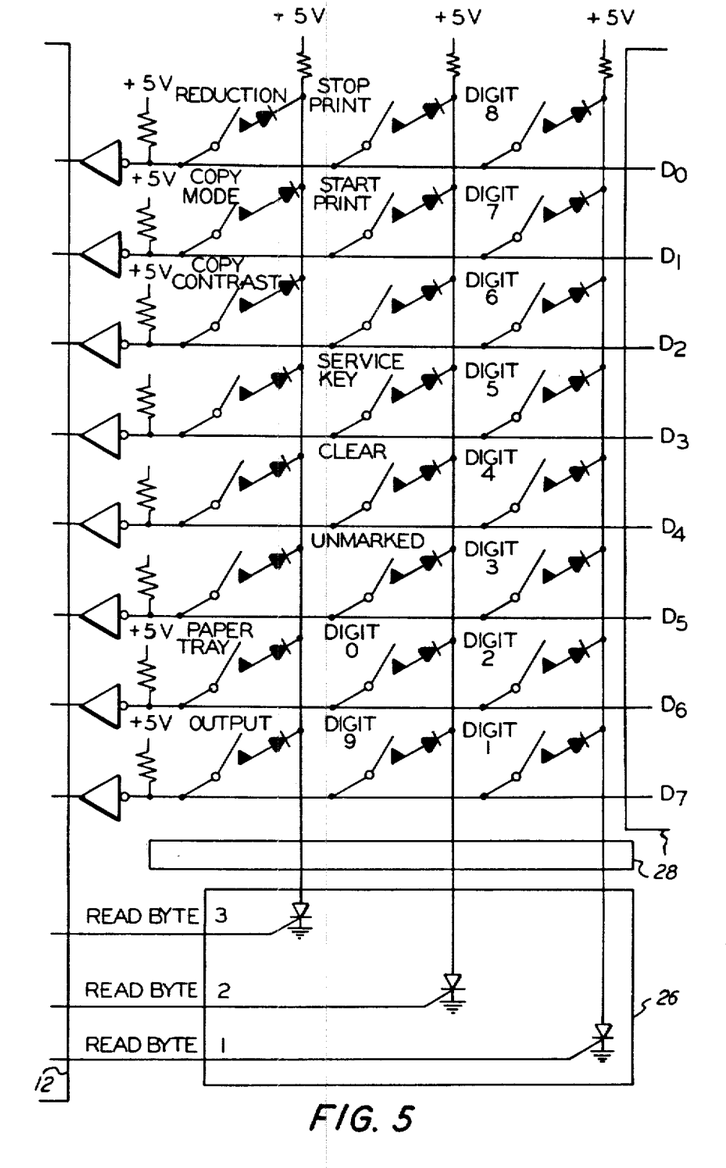
FIG. 5 is a schematic illustration of the interconnection of the push button switches shown in FIG. 4 with the controller of FIG. 1.

With reference to FIG. 4, there is shown the operator's control console 262 including various inputs switches and indicator lamps. The interconnection of these switches and the main panel interface module 28, the input matrix module 26 and the CPU module 12 are illustrated in FIG. 5. Of course all connections to the CPU module are through the input/output module 14.

The console switches are continuously monitored by a switch scan procedure to initiate the correct operation for a particular combination of switch inputs. The inputs from the twenty console switches are arranged into three bytes of information as set forth below in Table II.

TABLE II

| | | | BIT POSITIONS | | | | |
|---|---|---|---|---|---|---|---|
| D7 | D6 | D5 | D4 | D3 | D2 | D1 | D0 |
| Keybd Bit | Bit | Bit | Bit | Bit | Bit | Bit | Bit |
| Byte 1  1 | 2 | 3 | 4 | 5 | 6 | 7 | 8 |
| Keybd Bit | Bit | Bit | Bit | Bit | Bit | Bit | Bit |
| Byte 2  9 | 0 | Un-Marked | Clear | Serv. Key | | Start Print | Stop Print |
| Keyb Byte 3 | Out-Put | Paper Tray | | | Copy Contrast | Copy Mode | Reduction |

Figure 6:
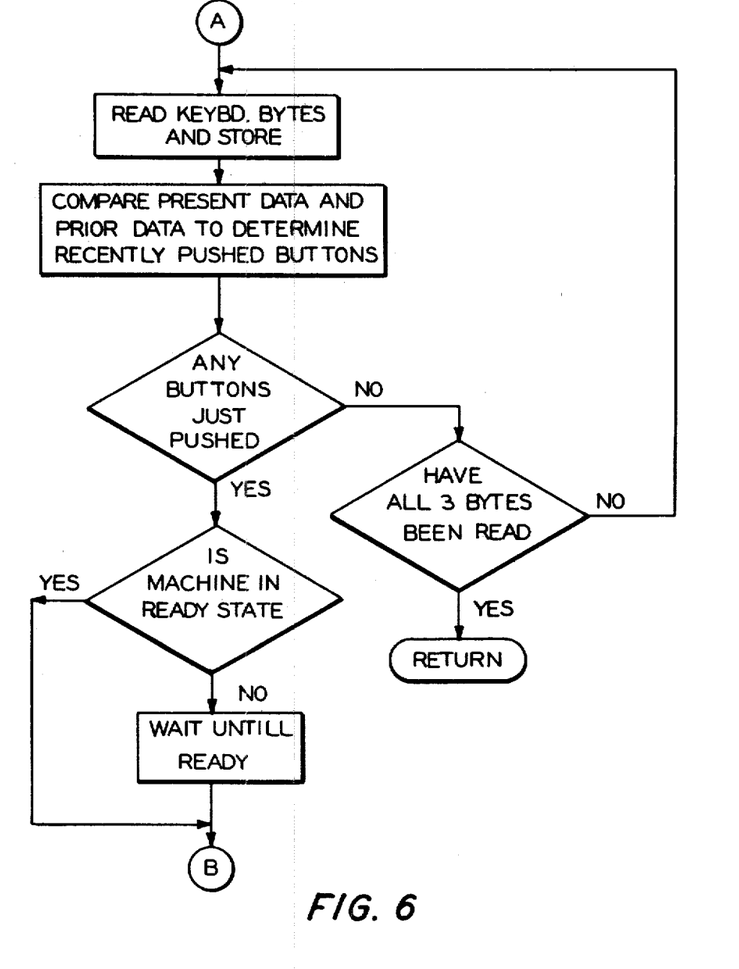
FIGS. 6 and 7 are a flow chart of the switch scan procedure of the controller disclosed in FIG. 1.
Figure 7:
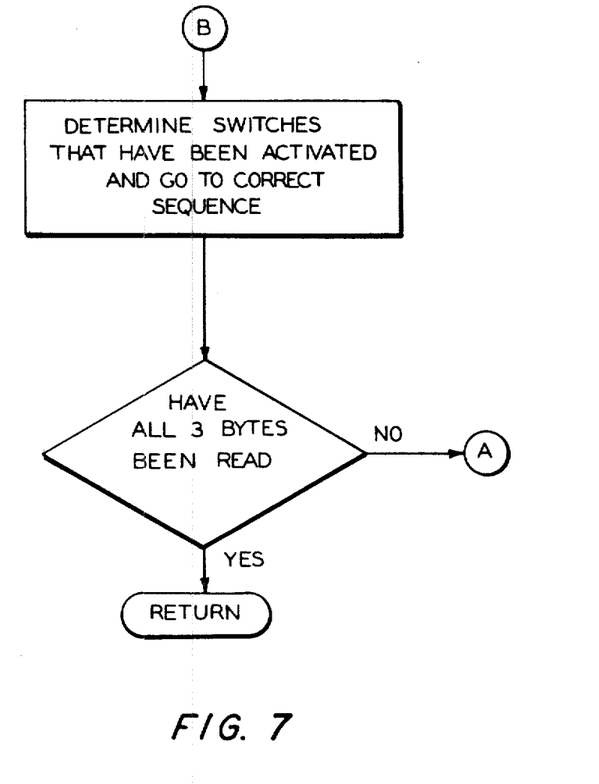

The switch scan procedure is shown in the flow charts of FIGS. 6 and 7. In particular, the scan is made every 20 milliseconds and in an effort to filter out noise, two readings of the byte are taken approximately 13 microseconds apart. If they are the same, a third reading is not required. If they are not the same, the result of a third reading taken approximately 13 microseconds later is used.

The machine is generally operating in one of eight different states namely an initialization, lamp test, run not print, print, ready, not ready, tech rep, and component control states. The system can be executing in only one state at a time. The system operates in a state until it recognizes a condition requiring a state change.

The initialization state is completed after a system self-test or system self diagnostics and in this state various flags and data are set to initial values required for system operation. The system enters the lamp test state and in this state turns on all front panel lights and indicates 8888 on the digital display 164 for an automatic lamp test feature. There is a short, approximately 5 seconds, display of all the front console lamps.

This occurs shortly after power is turned on and provides an indication to the operator of any burned out or otherwise inoperative display components. This also eliminates the need for a button to request the display. In addition it should be understood that as machine performance is monitored over a history of use, various changes are often required to the systems software to optimize operation. Generally these changes are made in various stages. Therefore for diagnostic and evaluation purposes it is often desirable to know the particular stage or level of software in the system. This information is available in the digit display 164 during this period of lamp tests by keying the unmarked push button 166 on the operator's console. A coded display will indicate the level of software in the system.

After the lamp test state, the system, at the expiration of the 5 seconds, enters the not ready state. There are approximately 11 conditions that must be satisifed before the system changes from the not ready to the ready state. For example, the lens selection must equal the lens position switch, that is, the lens must not be in motion, the bottom and top trays if selected must have enough paper, the fuser must be up to temperature, all stand by interlocks must be closed, the fuser must not be over-temperature, the photoreceptor belt must not be mistracked, all fault codes must be cleared, if RDH is selected it must not be in a jam condition, the offset catch tray 160 must not be full or the capacity cannot be exceeded, and the offset catch tray 160 must be emptied if two sided copy mode is selected.

The system next enters the ready state upon satisfying the not ready conditions and then is ready to enter the print state. From the ready state the system will normally go either to the print state back to the not ready state or to the tech rep state if required. Upon activation of the print button the system enters the print state. Upon completion of the reproduction run, or upon encountering a machine malfunction, the system exits from the print state to a run/not print state. After the completion of this state there is entered a not ready state.

The tech rep state is entered when the service key is on, the system is in not ready or ready state, and the display select and clear buttons are depressed simultaneously. This allows the tech rep to access programs not otherwise available, such as diagnostic programs.

In the various states, except the initialization state and the tech rep states, the machine or controller is generally performing housekeeping and systems operations. There are also provided a priority of interrupts to alert the controller of the reproduction machine events and requirements and to synchronize the controller and the reproduction machine. The events and requirements of the reproduction machine 10 generally require high speed response and to facilitate the response a multiple interrupts system is provided.

There are two external interrupts in particular a pitch reset interrupt and a machine clock interrupt. The pitch reset is the highest priority interrupt and is generated by a not shown reset switch synchronous with potential copy sheet registration in the reproduction machine. The interrupt initiates the resetting of various clocks and timed events for correctly operating on images and copy sheets in various stages in the process. The interrupt occurs only while the main motor is running and normally at a frequency of 1.25 Hz.

The second level of interrupt is the machine clock interrupt and is initiated by the machine clock pulses generated by a not shown magnetic pickup on the main drive motor. It performs the functions of scheduling and controlling events in synchronization during the print state and schedules and controls register output data to the reproduction machine components during all states of operation. A third interrupt, although a non-external interrupt, is a real time clock interrupt. This is the lowest priority interrupt used and the clock signals are produced by the controller clock to decrement several uniquely assigned memory cells at predetermined intervals. For a more detailed discussion of the overall operation of the controller, reference is made to U.S. Pat. No. 4,062,061, incorporated herein.

The control console 262 is generally organized into single push button cascaded displays. For example, the reproduction machine 10 in normal operation will produce full size copies unless the "reduction" button 268 is pressed. In other words, in system ready at start up, the lens 122 is in position for full size copying and the full size lamp 270 on console 262 is illuminated. However, upon actuation of the reduction button 268, the lens 122 will next position itself for 98% reduction with the corresponding lamp 272 illuminated. The next activation of the reduction button 268 will initiate the movement of the lens to the 74% reduction position with the corresponding lamp 274 illuminated, and similarly the system is moved to the 65% reduction and lamp 276 illuminated upon activation of button 268. The next activation of button 268 will return to a full size illumination.

Similarly, the operator may select normal, dark, or light output by successive actuation of the copy push button. As described, the successive pressing of push button 278 causes the controller to acknowledge by illuminating appropriate lamps and stepping from one selection to another in a wrap-around sequence. In a similar manner, the successive activation of the unmarked button 266 of the machine in a recirculating document handler diagnostic condition displays successive events relating to document handler operation according to the present invention.

In accordance with the present invention, the display 264 of the controller will indicate six event times during the diagnostic running or exercising of the recirculating document handler. During this diagnostic procedure, any number of originals from 2 to 50 can be cycled.

With reference to FIG. 3, the six time intervals displayable are:

1. The time interval from the initiation of the feeder belt 166 until the lead edge of a document is sensed at the feed sensor 169;
2. A time interval for the lead edge of a document to the trail edge of the document to be sensed under the feed sensor 169. This is in effect, a determination of the speed of the document driving system at this section of the recirculating document handler;
3. The time interval from the time that the platen belt 174 is activated until the lead edge of a document is at the platen exit sensor 177.
4. The time interval from the time the lead edge of a document is at the platen exit sensor 177 until the lead edge is at the tray entry sensor 181;
5. The time interval from the lead edge to the trail edge of a document under the tray entry sensor 181; and
6. A time from the activation of the feeder belt 166 until the separator sensor 183 senses the set separator, or bail bar 185. That is, the set separator sensor 183 will sense the set separator 185 when the last document of a set has been cycled out of the input tray 154. This is the time interval, therefore, for the set separator 185 to fall and be sensed by the separator sensor 183 after the last document has been cycled out. Preferably, two documents are used for this test to insure frequent measurement opportunities.

It should be noted that if a jam should occur during this procedure, the recirculating document handler will stop. It is then possible to exit the diagnostic procedure to a regular run procedure and display a fault code to indicate a cause of the jam or malfunction. The procedure to display fault codes is well known and forms no part of the present invention.

The procedure for operating in the diagnostic state is to first enter the appropriate code at the operator console. This is done by activating the unmarked 266 and clear buttons simultaneously and then entering the code designating the RDH exerciser procedure. Again, the unmarked and clear buttons are simultaneously pressed and an event number between 1 and 6 is entered. This determines which time event will be initially displayed. Documents are then placed into the RDH tray and "Start Print" pressed. The RDH will start up and cycle the originals and the display will show the time interval in milliseconds for the event chosen. In particular, the display will indicate the number of the event selected in the left most digit and the two right digits will indicate hundreds and tens of time in milliseconds.

The following table lists the events, typical time intervals expected for each event, and a determined jam time in a preferred embodiment of the invention.

TABLE III

| EVENT # | TYPICAL TIME | JAM TIME |
| --- | --- | --- |
| 1 | 130 ms | 200 ms |
| 2 | 220 ms (8½" wide paper) | 250 ms |
| 3 | 130 ms | 180 ms |
| 4 | 190 ms | 300 ms |
| 5 | 220 ms (8½" wide paper) | 300 ms |
| 6 | 110 ms | N.A. |

In other words, for event 1, a preferred time interval from activation of the feeder belt 166 until the lead edge of the document is at the feed sensor 169 is 130 milliseconds. A time interval of 200 milliseconds will cause a jam. Therefore, as a service representative is viewing the display, a time interval of, for example, 180 milliseconds might indicate a condition leading to a jam.

In accordance with the present invention, to display any other events, it is only necessary to activate or press the unmarked button 266. Upon activation of the unmarked button, if an event 1 is being displayed, the event 2 time interval will then be displayed. This can be done while the diagnostics procedure is being run and is not necessary to exit the diagnostic procedure to a normal run procedure and then to return to a desired event.

For each successive activation of the unmarked button 266, successive event numbers will be displayed. Thus, the first activation will display event 2, the second activation will display event 3, until the sixth activation will return the display to event 1. The cycling or scrolling through of the display is possible even when the recirculating document handler is stopped. To continue again with the recirculation of the documents, it is only necessary to activate the clear button and re-enter the event number desired and press start print. All event values are stored in memory, even when the RDH is stopped. Therefore, at this time, any of the event times can be displayed. However, upon initiation of the recycling of documents, the old values in memory are cleared and the new values for each event are displayed and stored in memory as required.

It should also be noted that a fine resolution fault code related to each of the events 1-6 is available for display if a malfunction should occur during the diagnostic procedure. For example, a fine resolution fault code AA 17 is related to event number 1. In other words the failure of the lead edge of the document to reach the feed sensor 169 on time will generate a malfunction signal and a shutdown. This malfunction code can be displayed by pressing the unmarked and clear buttons. Obviously, in such a situation, it can be assumed that the event 1 time interval was 200 milliseconds or greater since this is the predetermined jam time interval. Therefore, if a jam occurs during the RDH exercising procedure and the event that corresponds to the jam is displayed, the display will be of the previous time interval and not the time interval causing the jam. It should be noted that the 6 display events are more precise indications of time intervals and possible tendencies toward a jam, whereas during normal copying operation, the same time intervals are measured but no malfunction is indicated unless the time interval exceeds the set jam time. In other words, the time intervals are pass/fail during normal copy operation and during the RDH exerciser procedure, the time intervals are precisely displayed for tech rep information and possible machine adjustment.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. In a reproduction machine having a recirculating document handler and a display, a plurality of displayable events being provided to monitor the recirculating document handler operation, the method of operating the recirculating document handler comprising the steps of:
   placing the reproduction machine in an evaluation condition for displaying the recirculating document handler events while inhibiting the production of copies,
   selecting a particular event to be displayed,
   displaying the particular event selected and a related indicator manifesting a particular recirculating document handler condition, and
   selectively displaying other of said displayable events and related conditions manifesting recirculating document handler conditions, the reproduction machine remaining in the recirculating document handler operation evaluation condition.

2. The method of claim 1 wherein the indicators corresponding to particular events display time intervals between selected stations in the recirculating document handler.

3. The method of claim 1 wherein the display manifests the number of the particular event selected and the time interval related to the particular event.

4. The reproduction machine of claim 1 including an event select button including the step of sequentially activating the button to selectively display and monitor different events and related time intervals.

5. In a reproduction machine for producing impressions of an original, the reproduction machine having a photosensitive member and a plurality of operating components cooperable with one another and the photosensitive member to produce the impressions on support material, the reproduction machine including a recirculating document handler, a method of analyzing the operation of the reproduction machine comprising the steps of:
   placing the machine in a recirculating document handler diagnostic condition, displaying a first indication of recirculating document handler conditions,
   maintaining the machine in a recirculating document handler diagnostic condition, and selectively displaying a second indicator of the recirculating document handler operation.

* * * * *